United States Patent [19]
Hartman

[11] Patent Number: 6,067,078
[45] Date of Patent: May 23, 2000

[54] DUAL SCREEN DISPLAY DEVICE

[75] Inventor: Hollister A. Hartman, Northville, Mich.

[73] Assignee: Lear Automotive Dearborn, Inc., Southfield, Mich.

[21] Appl. No.: 08/707,154

[22] Filed: Sep. 3, 1996

[51] Int. Cl.[7] .................................................. G06F 3/023
[52] U.S. Cl. ................................. 345/168; 345/7; 345/8; 345/157
[58] Field of Search .................................. 345/7, 8, 901, 345/121, 168, 157; 296/97.8; 364/424.03, 424.01; 341/20, 22, 33

[56] References Cited

U.S. PATENT DOCUMENTS

| | | | |
|---|---|---|---|
| 4,908,611 | 3/1990 | Iino | 340/705 |
| 5,260,729 | 11/1993 | Ullah et al. | 353/84 |
| 5,369,581 | 11/1994 | Hhsuga et al. | 364/424.01 |
| 5,428,355 | 6/1995 | Jondrow et al. | 341/20 |
| 5,534,888 | 7/1996 | Lebby et al. | 345/121 |
| 5,555,502 | 9/1996 | Opel | 364/424.05 |
| 5,582,518 | 12/1996 | Henique et al. | 434/44 |
| 5,757,268 | 5/1998 | Toffodo et al. | 340/461 |
| 5,867,133 | 2/1999 | Toffodo et al. | 345/7 |
| 5,871,251 | 2/1999 | Welling et al. | 296/97.05 |
| 5,873,621 | 2/1999 | Kuighadush et al. | 296/97.8 |

FOREIGN PATENT DOCUMENTS

| | | |
|---|---|---|
| 0409232A2 | 7/1990 | European Pat. Off. . |
| 2677313A1 | 6/1992 | France . |
| 3316818A1 | 11/1984 | Germany . |
| 4213129A1 | 10/1993 | Germany . |
| 4218179A1 | 12/1993 | Germany . |
| 4223354A1 | 1/1994 | Germany . |
| 296 08 032 U1 | 8/1996 | Germany . |
| 2183886A | 12/1985 | United Kingdom . |

OTHER PUBLICATIONS

Search Report for PCT Application No. PCT/US97/15059 dated Jan. 8, 1998.

*Primary Examiner*—William A. Cuchlinski, Jr.
*Assistant Examiner*—Marthe Y. Marc-Coleman
*Attorney, Agent, or Firm*—Brooks & Kushman P.C.

[57] ABSTRACT

A system for displaying electronically generated images within a vehicle includes two display screens. One display screen is dedicated to displaying images for the driver of the vehicle while the second display screen is dedicated to generating images for a passenger of the vehicle. The images on the two display screens are generated independently of each other. The display screens preferably are mounted on frames that are movable relative to each other and the interior of the vehicle so that one screen is viewable to the driver and the other faces a passenger.

17 Claims, 2 Drawing Sheets

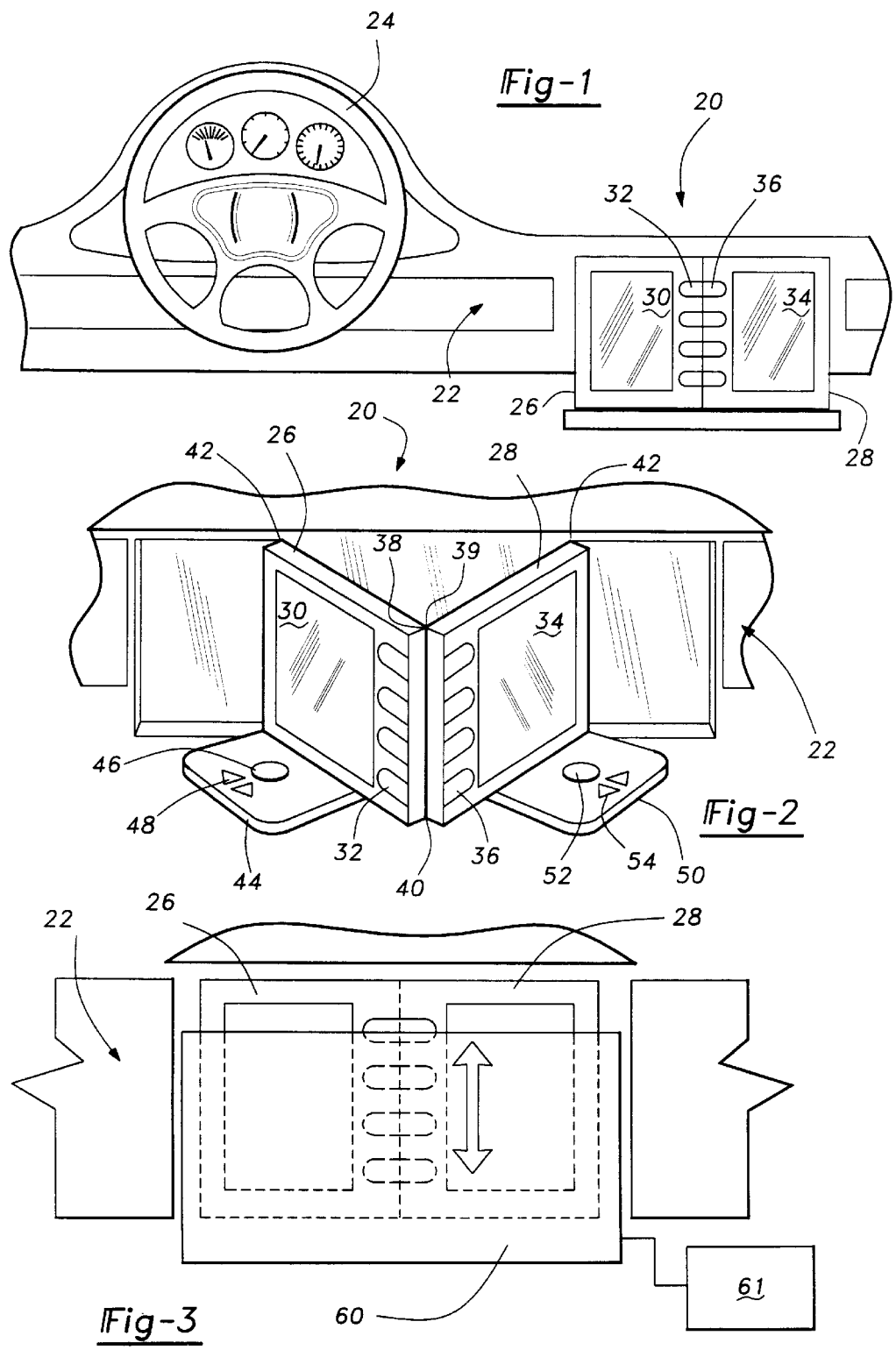

DUAL SCREEN DISPLAY DEVICE

BACKGROUND OF THE INVENTION

This invention relates to a system for displaying electronically generated images on more than one display screen within a vehicle.

The introduction of electronic displays within vehicles created the possibility of increased versatility in supplying information to a driver, for example. Presently proposed display systems, however, are not without limitations. For example, there is a limited amount of space available within the interior of a vehicle for placement of a display screen. Similarly, the size of a display screen is necessarily limited. Therefore, there is a need for a strategic placement of a display system within the vehicle.

Currently proposed systems have other shortcomings and drawbacks. For example, the placement of a display screen can be distracting to the driver of the vehicle because of its placement relative to the driver's normal seating position. It is important to minimize the amount of distraction a driver experiences from concentrating on the task of driving the vehicle. Additionally, some images displayed on a display screen may not be appropriate for a driver under most conditions. In some localities, the type of information that can be displayed on a display screen is limited by law. The same limitations do not apply to passengers within a vehicle, however. Therefore, it would be useful to provide a system that enables a driver to view certain information while a passenger can view different images.

This invention addresses the needs and shortcomings of currently proposed stems. This invention provides a unique dual-screen display system that enables driver to easily view certain images while a passenger views different images, independent of the driver.

SUMMARY OF THE INVENTION

In general terms, this invention is a system for displaying visual images within a vehicle. The system includes a first frame supported in the vehicle such that the first frame is movable between a plurality of positions. A first display screen is supported on the first frame. A second frame is supported in the vehicle such that it is movable between a plurality of positions. A second display screen is supported on the second frame. A controller is coupled to the first and second display screens and controls a displayed image on each screen such that a display on the first display screen is independent of a displayed image on the second display screen.

In the preferred embodiment, the first and second frames are supported on an instrument panel within the vehicle passenger compartment. The two frames are hingedly connected together at one edge so that they are movable relative to each other. The first and second display screens can, therefore, be oriented so that they are angled toward a driver and passenger, respectively.

The first and second frames preferably are moved between a storage position, where the first and second display screens are generally co-planar and a plurality of use positions where the screens are angled relative to each other. The system preferably includes a movable cover that covers over the display screens when they are in the storage position. A sensor determines when the cover is moved over the display screens and communicates that information to the controller. The controller responsively puts the display screens into a screen-saver mode and no image is displayed on the screens when they are in such an arrangement.

The various features and advantages of this invention will become apparent to those skilled in the art from the following detailed description of the presently preferred embodiment. The drawings that accompany the detailed description can be described as follows.

BRIEF DESCRIPTION OF THE DRAWINGS

FIG. 1 is a diagrammatic illustration of a display system designed according to this invention.

FIG. 2 is a diagrammatic illustration of the embodiment of FIG. 1 showing display screens in a use position.

FIG. 3 is a diagrammatic illustration of the embodiment of FIG. 1 showing display screens in a storage position.

DETAILED DESCRIPTION OF THE PREFERRED EMBODIMENT

Figure 4:
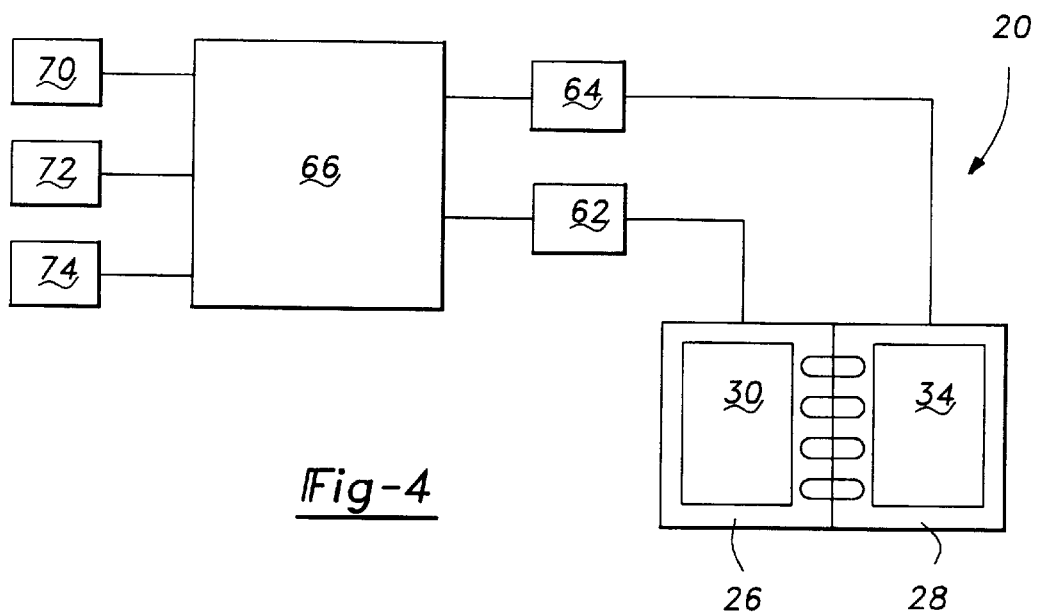
FIG. 4 is a schematic illustration of a system designed according to this invention.

FIG. 1 diagrammatically illustrates a visual display system 20 within a vehicle interior. In the illustrated embodiment, the display system 20 is supported on an instrument panel 22 in the general vicinity of a steering wheel 24. The display system 20 includes a first frame 26 and a second frame 28. A first display screen 30 is supported on the first frame 26. A plurality of control switches 32 are supported on the first frame 26. The control switches 32 are useful for adjusting or manipulating the display on the first display screen 30.

Similarly, a second display screen 34 is supported on a second frame 28. A plurality of control switches 36 are supported on the second frame 28 for adjusting and manipulating the display on the display screen 34.

In FIG. 1, the first frame 26 and the second frame 28 are positioned so that the first screen 30 and the second screen 34 are generally co-planar. The first frame 26 and the second frame 28 preferably are movable relative to each other and the instrument panel 22 so that the first display screen 30 and the second display screen 34 are movable between a plurality of viewing positions.

FIG. 2 illustrates a preferred orientation of the first frame 26 and the second frame 28 where the first display screen 30 is viewable by the driver of the vehicle and the second display screen 34 is viewable by a passenger. An edge 38 on the first frame 26 preferably is hingedly connected to an edge 39 on the second frame 28. Accordingly, the first frame 26 and the second frame 28 pivot relative to each other about the hinged connection 40. Pivotal and slidable connections 42 preferably are provided at opposite ends of the first and second frames to facilitate movement of the first and second frames between the generally co-planar position illustrated in FIG. 1 and the outwardly protruding angled position illustrated in FIG. 2. The specific hardware and configuration of the first frame 26 and second frame 28, the hinged connection 40 and the pivotal and slidable connections 42 can be developed by those skilled in the art and, therefore, need not be described in further detail in this specification.

A first shelf portion 44 includes a multi-purpose adjustment switch 46 and a pair of control switches 48. The adjustment switch 46 and control switches 48 are manipulable by a user (in this case the driver of the vehicle) to make adjustments and selections for altering the display on the display screen 30. Similarly, a second shelf portion 50 is provided with a multi-purpose adjustment switch 52 and control switches 54 for adjusting the display on the second display screen 34. In the illustrated embodiment, the adjustment swiches 46 and 52 are multiple purpose adjustment switches that can be pressed and rotated while the control switches 48 and 54 are two-position, pressable switches.

The first shelf portion 44 and the second shelf portion 50 preferably are supported at an angled position relative to the first and second frames, respectively.

The shelf portions preferably are also movable between a use position (as illustrated in FIG. 2, for example) and a storage position where the shelf portions are tucked away into the instrument panel 22. Any physical arrangement of the shelf portions relative to the frames that allow for the shelf portions to be moved between a storage position and a use position could be incorporated within the scope of this invention.

FIG. 3 illustrates the first frame 26 and the second frame 28 in a generally co-planar alignment, which can be referred to as a storage position. A movable cover 60 preferably is provided for protecting the display screens 30 and 34 when they are not in use. The cover 60 preferably slides between a covering position where the cover 60 generally extends over the display screens and a storage position where the cover is tucked away inside the instrument panel 22.

Referring now to FIG. 4, further components of the display system 20 are schematically illustrated. A first control module 62 is coupled to the first display screen 34 while a second control module 64 is coupled to the second display screen 34. The control module 62 and 64 are coupled with a video controller 66. The video controller is any computer or micro-processor that is commercially available and usable for controlling images on a display screen, for example. The divisions of the controller 66 and the first and second control modules 62 and 64 are for schematic illustration purposes only. The functions of each that are described in this specification could be incorporated into a single microprocessor or computer as will be appreciated by those skilled in the art.

The video controller 66 controls the images to be displayed on the two display screens. The first control module 62 is an interface between the controller 66 and the first display screen 30 so that an image on the first display screen can be controlled through the controller 66 independently of an image on the second display screen 34. The control module 62 also facilitates the ability of the controller 66 to adjust the image on the display screen 30 in response to manipulation of the control switches 32, the adjustment switch 46 or the control switches 48. The same is true of the second control module 64, with respect to the second display screen 34.

The controller 66 preferably is also coupled to a plurality of vehicle sub-systems. Example sub-systems include the heating, ventilation and air conditioning system 70, a radio 72 and cruise control 74. In the preferred embodiment, the controller 66 not only controls images on the display screens 30 and 34 but also controls the operation of the vehicle sub-systems to which it is connected. In the preferred embodiment, the driver is able to utilize one of the control switches 32 to have the radio sub-system displayed on the first display screen 30. The driver can then make changes to the radio operation by manipulating the adjustment switch 46 and the control switches 48, for example. The controller 66 then responsively changes the operation of the radio to make it consistent with a display on the display screen 30. The passenger preferably is provided similar privileges. Because the images on the two display screens are independent, however, in the preferred embodiment certain functions available to the driver are not available to the passenger and vice versa.

Referring back to FIG. 3, a position sensor 61 detects a position of the cover 60. When the cover 60 is in the position to cover over the display screens in the storage position, the position sensor 61 communicates with the controller 66. The controller 66 determines that the cover 60 is covering over the display screens and responsively institutes a screen-saver mode so that the display screens do not display any image.

Figure 5:
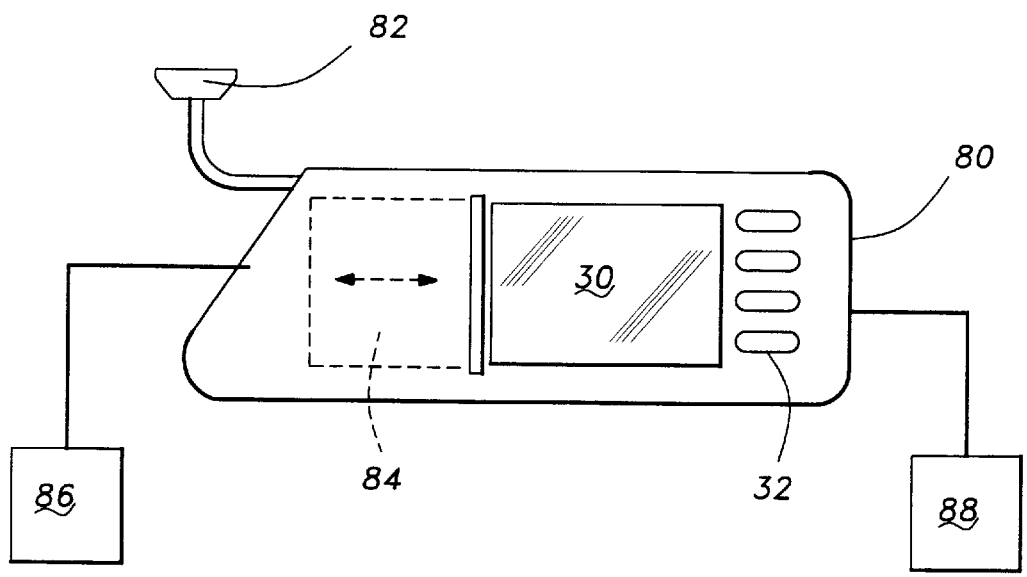
FIG. 5 is a diagrammatic illustration of an alternative embodiment of this invention.

FIG. 5 illustrates an alternative embodiment of this invention. FIG. 5 illustrates the first display screen 30 supported on a visor 80 that is mounted within the vehicle on the driver's side of the vehicle by a conventional mount 82. The second display screen 34 preferably is mounted on a visor on the passenger's side of the vehicle in like manner. The visor 80 includes a cover 84 that is movable between a storage position and a position where it covers over the display screen 30. A position sensor 86 detects when the cover 84 is in a position to cover over the display screen 30 and communicates that information with the controller 66. In that instance, the controller 66 places the display screen 30 into a screen-saver mode to preserve the display screen 30 and to conserve energy within the system.

The visor 80 is movable through a plurality of positions. In the preferred embodiment, the control module 62 communicates with a visor position sensor 88, which indicates the position of the visor 80 relative to the roof of the vehicle. The control module 62 preferably is programmed to adjust an image on the display screen 30 depending on the position of the visor 80. For example, when the visor is in a generally vertical position, (i.e., generally perpendicular to the roof of the vehicle) the image on the display screen is generated in a first mode. When the visor 80 is tilted toward or away from the driver, however, an adjustment must be made for clear viewing of an image on the screen 30. The control module 62 preferably is programmed to make adjustments to the image so that it can be easily seen by the driver of the vehicle whenever the visor 80 is positioned within an acceptable range of angular orientations relative to the roof of the vehicle. One skilled in the art can develop specific code to program the control module 62 or the controller 66 to accomplish the just-described results.

The foregoing description is exemplary rather than limiting in nature. Variations and modifications to the disclosed embodiments will become apparent to those skilled in the art that do not necessarily depart from the purview and spirit of this invention. Accordingly, the legal scope of this invention can only be determined by studying the following claims.

What is claimed is:

1. A device for displaying an electronically generated image within a vehicle, comprising:
   a frame including first and second panel support surfaces that is supported on an instrument panel in the vehicle, each panel support surface having an inside edge and an outside edge, wherein the inside edge of the first support surface is adjacent to the inside edge of the second support surface;
   a first display screen supported on the first panel support surface;
   a second display screen supported on the second panel support surface;
   a first control switch supported near said first display screen that is manipulable to control a display on said first display screen;
   a second control switch supported near said second display screen that is manipulable to control a display on said second display screens; and
   wherein said panel support surfaces are movable relative to each other between a first position where said first and second display screens are generally co-planar and a second position in which the support surfaces inside edges are moved out of the plane and away from the instrument panel such that said first and second display screens are angled relative to each other to face outwardly and away from each other for independent viewing by different observers.

2. The device of claim 1, wherein the first and second panel support surfaces each include a front face, said display screens being supported on said panel support surfaces such that said screens are generally co-planar with said front faces, respectively, said inside edges of said support surfaces being adjacent each other and hingedly connected such that said support surfaces are movable between said first and second positions.

3. The device of claim 2, wherein said outside edges of said support surfaces are pivotally and slidably supported on said instrument panel such that said outside edges pivot and slide relative to said instrument panel when said panel support surfaces are moved between said first and second positions.

4. The device of claim 3, further comprising a cover that is supported on said instrument panel and movable between a first cover position where said cover covers over said frame and display screens when said panel support surfaces are in said first position and a second cover position where said display screens are not covered by said cover.

5. The device of claim 1, further comprising a first shelf portion that is supported to extend generally away from said first display screen and a second shelf portion that is supported to extend generally away from said second display screen, and wherein each said shelf portion includes at least one adjustment switch that is manipulable to control a displayed image on a respective display screen.

6. The device of claim 5, wherein said first and second shelf portions are moveable relative to said panel support surfaces between a use position where said adjustment switch is accessible to a user for controlling a displayed image and a storage position.

7. A system for displaying visual images within a vehicle, comprising:
   a first frame supported in the vehicle such that said first frame is movable between a plurality of positions;
   a first display screen supported on said first frame;
   a second frame supported in the vehicle such that said second frame is movable between a plurality of positions;
   a second display screen supported on said second frame; and
   a controller that is coupled to said first and second display screens and is further coupled to at least one vehicle sub-system, the controller being configured to provide first and second independent visual interfaces by controlling a displayed image on each screen such that a displayed image on said first display screen is independent of a displayed image on said second display screen.

8. The system of claim 7, wherein said first frame is supported on a first visor within the vehicle and wherein said second frame is supported on a second visor within the vehicle, said first and second visors being moveable between a plurality of positions.

9. The system of claim 8, further comprising a first position sensor that senses a position of said first visor and a second position sensor that senses a position of said second visor, said position sensors communicating with said controller such that said controller adjusts a display on said first display screen responsive to a position of said first visor and wherein said controller adjusts a display on said second display screen responsive to a position of said second visor.

10. The system of claim 7, wherein said first frame includes an edge, said second frame includes an edge that is adjacent said first frame edge and wherein said edges are hingedly connected such that said first and second frames are hingedly moveable relative to each other.

11. The system of claim 7, further comprising a first plurality of selection switches supported on said first frame and a second plurality of selection switches supported on said second frame, said selection switches being manipulable to select an image to be displayed on said display screens, respectively.

12. The system of claim 11, wherein said controller is coupled to a plurality of subsystems within the vehicle and wherein said controller controls said display screens to display one of said subsystems responsive to one of said selection switches being manipulated by a user of said system.

13. The system of claim 12, further comprising a first adjustment switch for adjusting a display on said first display screen and a second adjustment switch for adjusting a display on said second display screen, and wherein said controller alters an operation condition of a displayed vehicle subsystem responsive to said adjustment switches being manipulated.

14. The system of claim 7, further comprising a first shelf portion supported near said first frame and including a first adjustment switch that is manipulable to adjust an image on said first display screen and a second shelf portion supported near said second frame and including a second adjustment switch that is manipulable to adjust an image on said second display screen, said shelf portions being movable between a use position where said adjustment switches are accessible to a user and a storage position.

15. The system of claim 7, further comprising a cover that is moveable between a covering position where said cover is generally over said display screens and a storage position and wherein said controller determines a position of said cover and automatically controls said display screens such that said display screens do not display an image when said cover is in said covering position.

16. A device for displaying an electronically generated image, comprising:
   a frame including two panel support surfaces;
   a first display screen supported on one of said panel support surfaces;
   a second display screen supported on the other of said panel support surfaces;
   a first control switch supported near said first display screen that is manipulable to control a display on said first display screen;
   a second control switch supported near said second display screen that is manipulable to control a display on said second display screen independent of said first display screen;
   a first shelf portion that is supported to extend generally away from said first display screen including at least one adjustment switch that is manipulable to control a displayed image on said first display screen;
   a second shelf portion that is supported to extend generally away from said second display screen including at least one adjustment switch that is manipulable to control a displayed image on said second display screen independent of said first display screen; and
   wherein said panel support surfaces are movable relative to each other between a first position where said first and second display screens are generally co-planar and a second position where said first and second display screens are angled relative to each other.

17. The device of claim 16, wherein said first and second shelf portions are movable relative to said panel support surfaces between a use position where said adjustment switch is accessible to a user for controlling a displayed image and a storage position.

* * * * *

UNITED STATES PATENT AND TRADEMARK OFFICE
CERTIFICATE OF CORRECTION

PATENT NO : 6,067,078
DATED : May 23, 2000
INVENTOR(S) : HOLLISTER A. HARTMAN

It is certified that error appears in the above-identified patent and that said Letters Patent are hereby corrected as shown below:

Column 5, Line 63, Claim 6: delete "moveable" and insert --movable--.

Column 6, Line 22, Claim 8: delete "moveable" and insert --movable--.

Column 6, Line 38, Claim 10: delete "moveable" and insert --movable--.

Column 7, Line 4, Claim 15: delete "moveable" and insert --movable--.

Signed and Sealed this

Third Day of April, 2001

Attest:

NICHOLAS P. GODICI

Attesting Officer

Acting Director of the United States Patent and Trademark Office